United States Patent
Handel et al.

(10) Patent No.: US 9,609,004 B2
(45) Date of Patent: Mar. 28, 2017

(54) PROCESS LEVEL LOCALITY AND SPECIALIZATION FOR THREAT DETECTION IN THE DENDRITIC CELL ALGORITHM

(71) Applicant: The Boeing Company, Huntington Beach, CA (US)

(72) Inventors: Mark Jonathan Handel, Seattle, WA (US); Douglas Alan Stuart, St. Charles, MO (US); Hugh L Taylor, Mukilteo, WA (US); Steven A. Dorris, Saint Peters, MO (US)

(73) Assignee: THE BOEING COMPANY, Chicago, IL (US)

( * ) Notice: Subject to any disclaimer, the term of this patent is extended or adjusted under 35 U.S.C. 154(b) by 105 days.

(21) Appl. No.: 14/334,037

(22) Filed: Jul. 17, 2014

(65) Prior Publication Data
US 2016/0021125 A1  Jan. 21, 2016

(51) Int. Cl.
*H04L 29/06* (2006.01)
*G06F 21/56* (2013.01)

(52) U.S. Cl.
CPC ........ *H04L 63/1416* (2013.01); *G06F 21/566* (2013.01); *H04L 63/145* (2013.01); *H04L 63/1425* (2013.01)

(58) Field of Classification Search
CPC . H04L 63/1425; H04L 63/14; H04L 63/1416; G06F 21/50; G06F 21/55; G06F 21/56
See application file for complete search history.

(56) References Cited

U.S. PATENT DOCUMENTS

2013/0081141 A1* 3/2013 Anurag ............... G06F 21/55
  726/23
2014/0165198 A1* 6/2014 Altman ............... H04L 63/145
  726/23

OTHER PUBLICATIONS

Zheng et al., Principle and Application of Dendritic Cell Algorithm for Intrusion Detection, 2011, IPCSIT vol. 48, http://www.ipcsit.com/vol48/015-ICSPS2011-S0177.pdf.*
Ou et al., Multiagent-Based Dendritic Cell Algorithm with Applications in Computer Security, 2011, vol. 6591 of the series Lecture Notes in Computer Science pp. 466-475, http://link.springer.com/chapter/10.1007%2F978-3-642-20039-7_47.*
Julie Greensmith, The Dendritic Cell Algorithm, Oct. 2007, https://pdfs.semanticscholar.org/8368/b433f255b35d09b5a09d20628c19dbe8b00a.pdf.*
Lei Ding, Survey of DCA for Abnormal Detection, Aug. 2013, Journal of Software, vol. 8, No. 8.*
Julie Greensmith, Detecting Danger: The Dendritic Cell Algorithm, 2008, Robust Intelligent Systems, DOI: 10.1007/978-1-84800-261-6 5.*

(Continued)

*Primary Examiner* — Saleh Najjar
*Assistant Examiner* — Khang Do
(74) *Attorney, Agent, or Firm* — Parsons Behle & Latimer (57) ABSTRACT

Artificial Immune Systems (AIS) including the Dendritic Cell Algorithm (DCA) are an emerging method to detect malware in computer systems. An implementation of the DCA may detect anomalous behavior in various processes of a device or devices. Unlike previous approaches, the DCA implementation may use an inflammation signal to communicate information among the processes of device or a network, where the inflammatory signal indicates a likelihood that a process has been attacked by malicious software.

18 Claims, 5 Drawing Sheets

(56) References Cited

OTHER PUBLICATIONS

Pereira, Artificial Immune System Algorithm based on Danger Theory, Apr. 2011, web.ist.utl.pt/gdgp/VA/data/danger_dca.pdf.*

Greensmith, Julie, et al, Articulation and Clarification of the Dendritic Cell Algorithm; Lecture Notes in Computer Science vol. 4163, pp. 404-417 , UK Jan. 1, 2006.

Greensmith, Julie, et al, Dendritic Cells for SYN Scan Detection; Proceedings of the Genetic and Evolutionary Computation Conference (GECCO 2007) Jan. 1, 2007, pp. 49-56.

Al-Hammadi, Yousof, DCA for Bot Detection; Proceedings of the IEEE World Congress on Computational Intelligence (WCCI2008), Hong King, p. 1807-1816, Jan. 1, 2008.

Gu, Feng, et al, Exploration of the Dendritic Cell Algorithm Using the Duration Calculus; Proceedings of 8th International Conference on Artificial Immune Systems (ICARIS 2009), Lecture Notes in Computer Science 5666, York, UK, pp. 1-13, Jan. 1, 2001.

Gu, Feng, et al, Quiet in Class: Classification, Noise and the Dendritic Cell Algorithm; Proceedings of the 10th International Conference on Artificial Immune Systems (ICARIS 2011), LNCS vol. 6825, pp. 173-186, Cambridge, UK Jan. 1, 2011.

Greensmith, Julie, The Deterministic Dendritic Cell Algorithm; Lecture Notes in Computer Science vol. 5132, pp. 291-302, Phuket, Thailand Aug. 10, 2008.

Greensmith, Julie, et al, Introducing Dendritic Cells as a Novel Immune-Inspired Algorithm for Anomaly Detection; 4th International Conference, ICARIS 2005, pp. 153-167, Banff, Alberta, Canada Aug. 14, 2005.

Gu, Feng, et al, Integrating Real-Time Analysis With the Dendritic Cell Algorithm Through Segmentation ; In Genetic and Evolutionary Computation Conference (GECCO 09), Montreal Quebec, Canada Jul. 8, 2009.

* cited by examiner

PROCESS LEVEL LOCALITY AND SPECIALIZATION FOR THREAT DETECTION IN THE DENDRITIC CELL ALGORITHM

FIELD OF THE DISCLOSURE

The present application relates generally to computing security, and more particularly to malware detection systems and methods based on the Dendritic Cell Algorithm (DCA).

BACKGROUND

Malware (viruses, trojans, "advanced persistent threats," etc.) represents a significant potential risk in embedded network systems, such as, for example, computer networks in factory control systems. Safeguarding the integrity of a given network is often an important task for ensuring the overall safety of critical systems. As a result, detection of viruses and malware is an increasingly critical task in embedded systems.

Unfortunately, recent trends demonstrate that malware creators are willing to dedicate significant time and resources to the dissemination of malware, and the malware can often be cloaked and hidden in sophisticated ways. Usefully, viruses and hosts have been waging an on-going war in the biological domain for many centuries. The outcome of the biological war has been a remarkably sophisticated and subtle system that can quickly detect, attack, and kill harmful invaders, while managing to avoid not only damage to the self, but also killing other symbiotic organisms in the body.

Artificial immune systems (AIS) are a collection of algorithms developed from models or abstractions of the function of the cells of the human immune system. One category of AIS is based on the Danger Theory, and includes the Dendritic Cell Algorithm (DCA), which is based on the behavior of Dendritic Cells (DCs) within the human immune system. DCs have the power to suppress or activate the immune system through the correlation of signals from an environment, combined with location markers in the form of antigen. The function of a DC is to instruct the immune system to act when the body is under attack, policing the tissue for potential sources of damage. DCs are natural anomaly detectors, the sentinel cells of the immune system. The DCA has demonstrated potential as a static classifier for a machine learning data set and anomaly detector for real-time port scan detection.

The DCA has been described in a number of references, including Greensmith, Aickelin and Twycross, *Articulation and Clarification of the Dendritic Cell Algorithm*. In Proc. of the 5th International Conference on Artificial Immune Systems, LNCS 4163, 2006, pp. 404-417. The following features of the DCA differentiate the algorithm from other AIS algorithms: (1) multiple signals are combined and are a representation of environment or context information; (2) signals are combined with antigen in a temporal and distributed manner; (3) pattern matching is not used to perform detection, unlike negative selection; and (4) cells of the innate immune system are used as inspiration, not the adaptive immune cells, and unlike clonal selection, no dynamic learning is attempted.

As described in the DCA literature, DCs can perform various functions, depending on their state of maturation. Modulation between these maturation states is facilitated by the detection of signals within the tissue, namely: (1) danger signals, (2) pathogenic associated molecular patterns (PAMPs), (3) apoptotic signals (safe signals), and (4) inflammatory cytokines. The DCA has been implemented successfully in various localized applications, which have made use of danger signals, PAMPs, and safe signals. However, existing DCA implementations have not made use of signals analogous to the inflammatory cytokines of DCs in the biological domain.

SUMMARY

The present application discloses an implementation of the DCA that detects anomalous behavior in various processes in a computing device. Unlike previous approaches, the DCA implementation described herein makes use of an inflammation signal to communicate information among the various processes of the computing device.

In one example, a system comprises a first process and a first dendritic cell algorithm (DCA) module, wherein the first DCA module uses the DCA to analyze the first process to determine if malicious software exits, wherein the first DCA module comprises an inflammatory signal indicating a likelihood that the first process has been attacked by malicious software. The system may comprise a second process and a second DCA module, wherein the second DCA module uses the DCA to analyze the second process to determine if malicious software exists. The inflammatory signal may comprise a continuous variable having a value within a range of −1 to 1. The inflammatory signal may have a strength proportional to a degree of certainty that the first and second processes have been attacked by malicious software. The sensitivity of the DCA module may be reduced in response to receiving a status signal. The status signal may indicate that a process is functioning normally.

The first DCA module of the system may comprise a plurality of sensors configured to measure raw sensor data, a plurality of indicators created based on raw sensor data measured by the sensors, a signal combiner, a tissue module, and a plurality of individual dendritic cell (DC) instances. The tissue module of the system may comprise a temporal combiner that combines one or more aggregated signals from the signal combiner to generate a DC-Seen signal that is communicated to the plurality of individual DC instances. The raw sensor data may comprise individual process information. The indicators may comprise one or more signals representative of a heartbeat, packet size, network address, bandwidth, or processor load. The signal combiner may sum the indicators. The signal combiner may average the indicators. The tissue module of the system may manage a store of indicator signals and antigen signals, and provides data to the plurality of individual DC instances.

In one example, a method of operating a computer network comprising a plurality of computing nodes comprises running a DCA on a first DCA module, identifying a harmful antigen by observing abnormal activity of a first process based on predetermined criteria established by the first DCA module, and transmitting an inflammatory signal based on the abnormal activity of the first process from the first DCA module to a second DCA module. The method may comprise running a DCA on a second DCA module, identifying a harmful antigen by observing abnormal activity of a second process based on predetermined criteria established by the second DCA module, and transmitting an inflammatory signal based on the abnormal activity of the second process from the second DCA module to a DCA module.

Running a DCA on the first DCA module may comprise initializing an individual DC instances within the first DCA module and receiving raw sensor data from sensors of the first DCA module. Running the DCA on the first DCA module may comprise creating an antigen signal in a data processing event and processing the raw sensor data to create an indicator signal comprising a vector of the following signals: (a) pathogenic associated molecular patterns (PAMP), (b) Danger, (c) Safe, and (d) inflammation signal. Running the DCA on the first DCA module may comprise passing the indicator signal to a signal transformation event, passing the antigen signal to an antigen sampling event, correlating the indicator signal and sampled antigen signals based on their time stamps, and determining whether a maturation threshold has been reached and, if so, changing the DC instance from a correlating state to an information presenting state. The antigen signal may represent a program name, a file name, or a network address or a node.

One example is a method of operating a DCA module comprising monitoring an indicator signal comprising a vector of PAMP, Danger, and Safe signals from monitoring a first process and receiving an inflammation signal based from a second process. The method comprises creating an aging out a plurality of individual DC instances, calculating an overall mature context antigen value (MCAV) as individual DC instances age out, and transmitting a current process status signal to a DCA module. The method may comprise determining whether the MCAV is above a selected threshold before transmitting the current process signal status.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

The present application discloses an implementation of the DCA that makes use of a known, but previously unused, feature of the DCA: inflammation, to signal of a possible attack among processes of a computing device. As used herein, the term "computing device" may refer to any device that includes a processor that is adapted to run one or more processes.

In some cases, as described below, various processes within a computing device run an instantiation of the DCA, which gathers "signals" from the process(es), and regularly determines the potential for a particular "antigen" to be harmful, based on pre-determined criteria. The processes within the computing device are linked together through various nodes, buses, or other channels of communication. When an anomaly is detected by the DCA of one process, it propagates an inflammation signal to other DCA modules within the computing device. This inflammation signal merely posits that an attack has been detected, but does not carry any details of the nature or mode of the attack. This approach helps to put other processes on alert to be more sensitive to anomalous behavior, while minimizing the risk of confirmation bias.

Previous work with the DCA has focused at the node or logical computing element. The present application moves the level of analysis from the node to an individual process or partition running on a node. Process, as used herein, should be understood to include a physical or logical partition, as well as a process. A system that implements the DCA may be made up of three component parts: signal detection and processing (also called "indicators"), antigen identification, and the DCA itself, which functions as a correlation mechanism between the signals and the antigens. This DCA system may run at the individual process or partition level, one system for each process or partition running on a computing device or in a network of computing devices.

The individual instances of the DCA system can be customized based on the features of the process being examined. The features of the process can be determined at process start-up, using attributes such as process name, process security level, any resources the process declares it will use, either directly through security entitlements, or indirectly via support libraries it imports. These features are used to customize the set of indicators as well as antigen identification algorithm that the DCA system will use to monitor the health of the process. The set of indicators can also be specified by a configuration mechanism to ensure that all instances are running at least a basic set of common indicators, or that certain classes of processes all get a particular set of indicators.

Once an instance of the DCA system is started up, the instances communicate in a light-weight fashion, using the inflammation signal as a way of reflecting the health of the process. This allows the process-level instances to incorporate "global" system health into their local computation about the health of the process. The use of DCA instances associated with the processes running on a computing device provides for a fine-grained examination of the integrity of the computing device. The analysis of the DCA at a process level may be beneficial. For example, where a number of different activities are being performed on a node, for instance, a common computing resource, the many different processes occurring may lead to false positives. The use of the DCA at the process level allows for specialization of the individual "detectors," while still allowing for coordination between the individual threat detectors.

Figure 1:
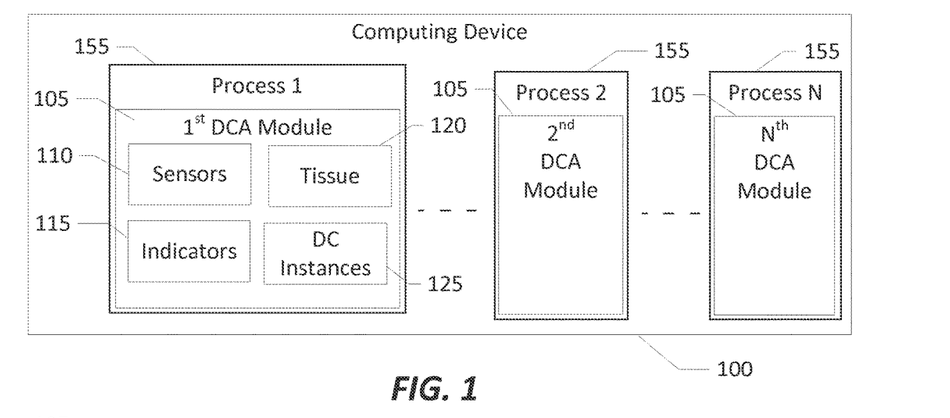
FIG. 1 is a block diagram illustrating one example of a computing device with a number of processes comprising a Dendritic Cell Algorithm (DCA) module.

FIG. 1 is a block diagram illustrating one example of a computing device 100 comprising a plurality of processes 155 and a plurality of Dendritic Cell Algorithm (DCA) modules 105. The computing device 100 may comprise various discrete computing devices (e.g., desktop computer, notebook computer, etc.), which may communicate with similar computing devices in a network. In other cases, the computing device 100 may comprise a logical "node" (e.g., virtual machine, computing process, etc.), which may operate in parallel with similar logical nodes within a single computing device. Therefore, as described above, a computing device may comprise a discrete computing device, a collection of logical nodes within a single computing device, and/or a combination of the two.

In the illustrated example, the computing device 100 comprises a plurality of processes 155 (labeled Process 1 through Process N in FIG. 1) operating in connection with DCA modules 105 within the computing device 100. In addition, each DCA module 105 comprises a plurality of sensors 110, indicators 115, a tissue module 120, and a plurality of individual dendritic cell (DC) instances 125. The operation and interaction of the components of the DCA module 105 are described below. In FIG. 1, the DCA Module 105 is depicted within the processes 155 for illustrative purposes only as a DCA Module 105 may correspond to a process 155 without being contained within the process 155. FIG. 1 also only depicts a single computing device 100 for illustrative purposes only as processes 155 and DCA modules 105 on multiple computing devices 100 may be in communication over various networks, wired and/or wireless, as would be appreciated by one of ordinary skill in the art having the benefit of this disclosure.

Figure 2:
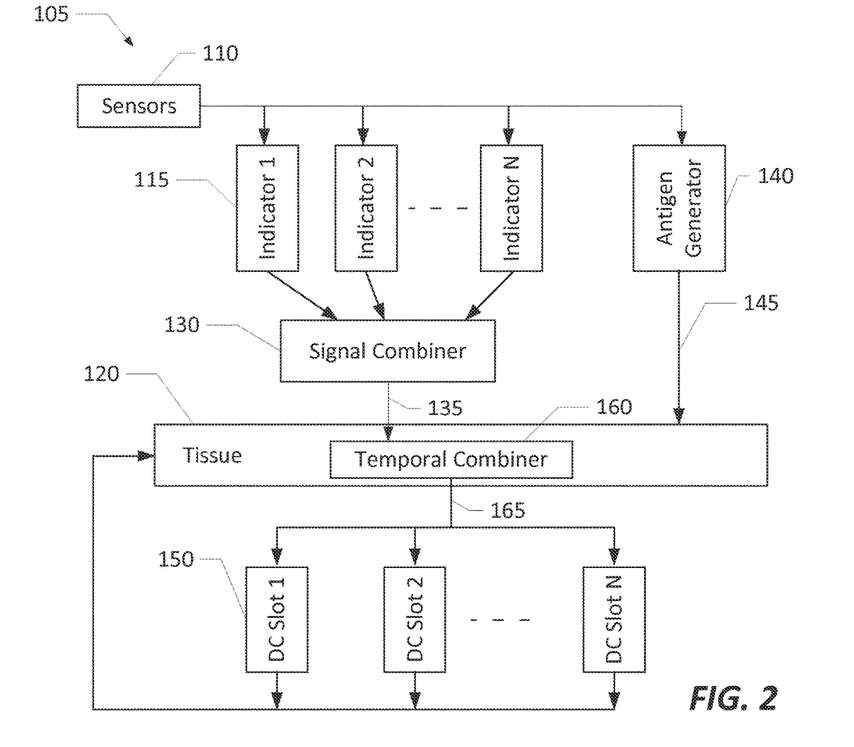
FIG. 2 is a block diagram illustrating one example of a DCA module.

FIG. 2 is a block diagram illustrating one example of a DCA module 105. In the example illustrated in FIG. 2, the DCA module 105 comprises a plurality of sensors 110, which measure raw sensor data, such as, for example, computer network information (e.g., packet data, etc.) and/or process information (e.g., processor time, memory usage, page faults, etc.). As shown in FIG. 2, the raw sensor data can be used to create a selected number of DCA indicators 115 (labeled Indicator 1 through Indicator N in FIG. 2), which may represent a wide variety of parameters. For example, in some cases, Indicator 1 may comprise a heartbeat or "keep alive" signal, Indicator 2 may comprise a processor load signal, and Indicator N may comprise a signal representing a sender's network address. Other examples of suitable indicators 115 may include signals indicative of parameters such as bandwidth, processor memory utilization, etc.

As shown in FIG. 2, the indicators 115 are combined by a signal combiner 130, which may perform a variety of suitable combination functions. For example, in some cases, the signal combiner 130 may sum the indicators 115, whereas in other cases, the signal combiner 130 may average the indicators 115. As yet another example, the signal combiner 130 may determine the median value of the indicators 115. Using a suitable combination function, the signal combiner 130 creates an aggregated indicator signal 135, which is provided as an input to the tissue module 120. In addition, the raw sensor data is used by an antigen generator 140 to create an antigen signal 145, which is also provided as an input to the tissue module 120.

An aggregated signal 135 and antigen 145 are created for each individual raw sensor "event." For example, in the case of network traffic, a raw sensor event may comprise a packet, whereas in the case of processor load, a raw sensor event may comprise a selected time period (e.g., 0.1 seconds, etc.). The tissue module 120, in turn, includes a temporal combiner 160, which combines an array of one or more aggregated indicator signals 135 received over time, to generate a "DC-Seen" signal 165. In some cases, the temporal combiner 160 may average the aggregated indicator signals 135, whereas in other cases, the temporal combiner 160 may determine the maximum or median of the aggregated indicator signals 135. The temporal combiner 160 includes a "look back" period, which may correspond to selected time period or number of events.

In operation, the tissue module 120 manages the indicator signal 135 and the antigen signal 145, and provides the DC-Seen signal 165 to a plurality of individual DC instances 125 located in a plurality of DC slots 150 (labeled DC Slot 1 through DC Slot N in FIG. 2). As the individual DC instances 125 age out, they present the resulting data back to the tissue module 120, which aggregates the data across the plurality of individual DC instances 125.

Figure 3:
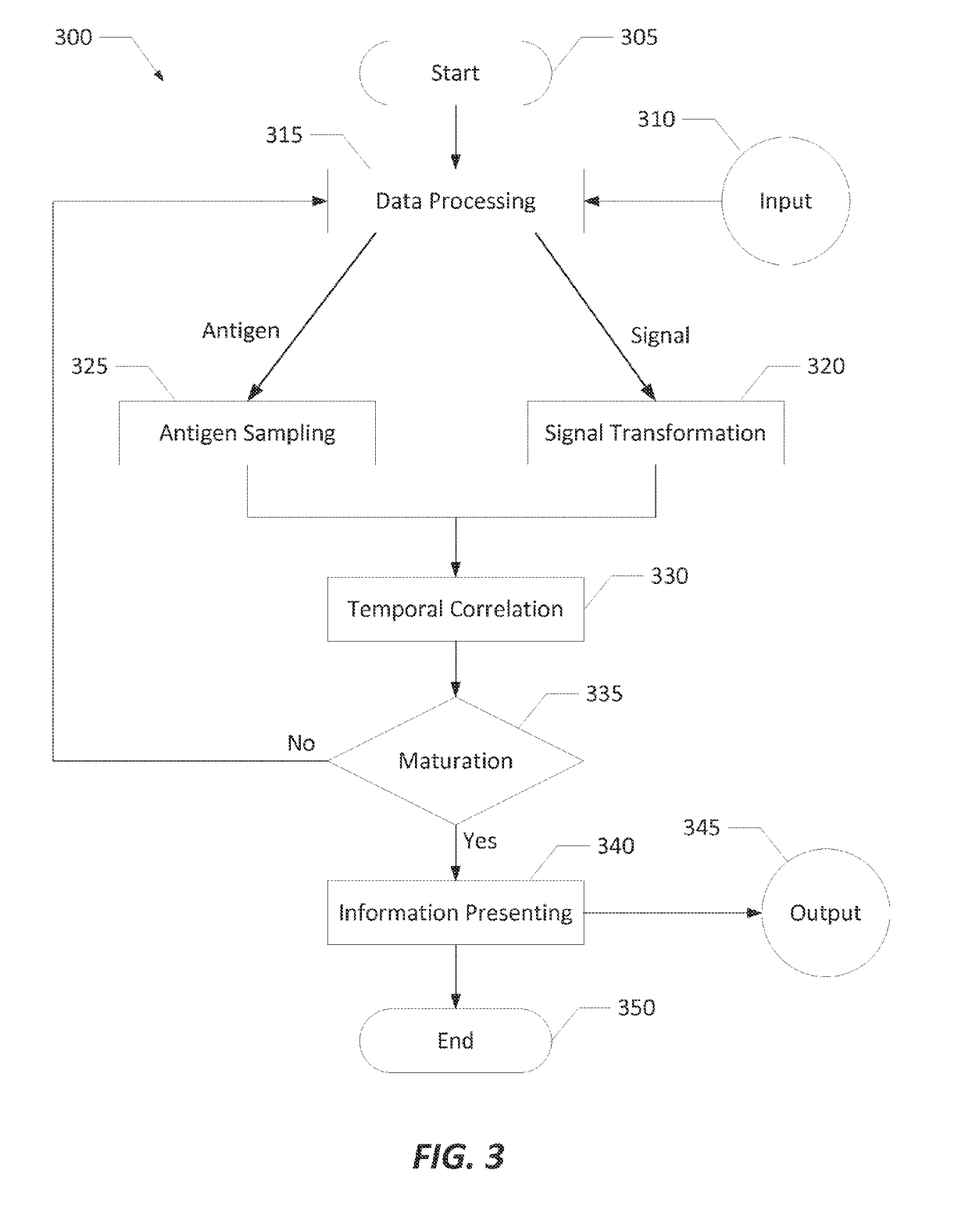
FIG. 3 is a flow chart illustrating a method of operating of an individual DC within a DCA module.

FIG. 3 is a flow chart illustrating an example of a process 300 for operating an individual DC instance 125 within a DCA module 105. In a first step 305, the DC instance 125 is created and initialized. During operation of the DC instance 125, as indicated at block 310, raw sensor data is provided by the sensors 110 of the DCA module 105. In a data processing event 315, an antigen signal 145 is created by the antigen generator 140, and the raw sensor data is processed to create an indicator signal 135. The antigen signal 145 typically represents an existing attribute of the system on which the DC instance 125 operates, such as, for example, the name of a program installed on the computing device 100, a file name, etc. In addition, as known in the DCA art, the indicator signal 135 may comprise a vector of the following signals: (a) PAMP, (b) Danger, (c) Safe, and (d) Inflammation signal.

The indicator signal 135 is passed to a signal transformation event 320. The antigen signal 145 is passed to an antigen sampling event 325. In each DC instance 125, a single indicator signal 135 and zero, one or more antigen signals 145 can be fed to the DC instance 125. The processed indicator signals 135 and sampled antigen signals 145 are correlated by a temporal correlation event 330 based on their time stamps. In a decision block 335, the process 300 determines whether a maturation threshold has been reached. If not, the process 300 returns to the data processing event 315. The DC instance 125 repeats the events described above cyclically, until the maturation threshold is reached, which indicates that the DC instance 125 has acquired sufficient information for decision making Once the DC instance 125 reaches its maturation threshold, the DC instance 125 changes from a correlating state to an information presenting state. Based on the indicator signals 135 and the antigen signals 145 correlated by the temporal correlation event 330, the DC instance 125 determines whether any potential anomalies appeared within the input data. The results of this decision are presented by an information presenting event 340 as the output of the DC instance 125, as indicated at block 345. In a final step 350, the DC instance 125 is terminated, marking the end of the lifespan of the DC instance 125. In many cases, the process 300 then returns to step 305, in which another DC instance 125 is created and initialized, and the process 300 is repeated.

Figure 4:
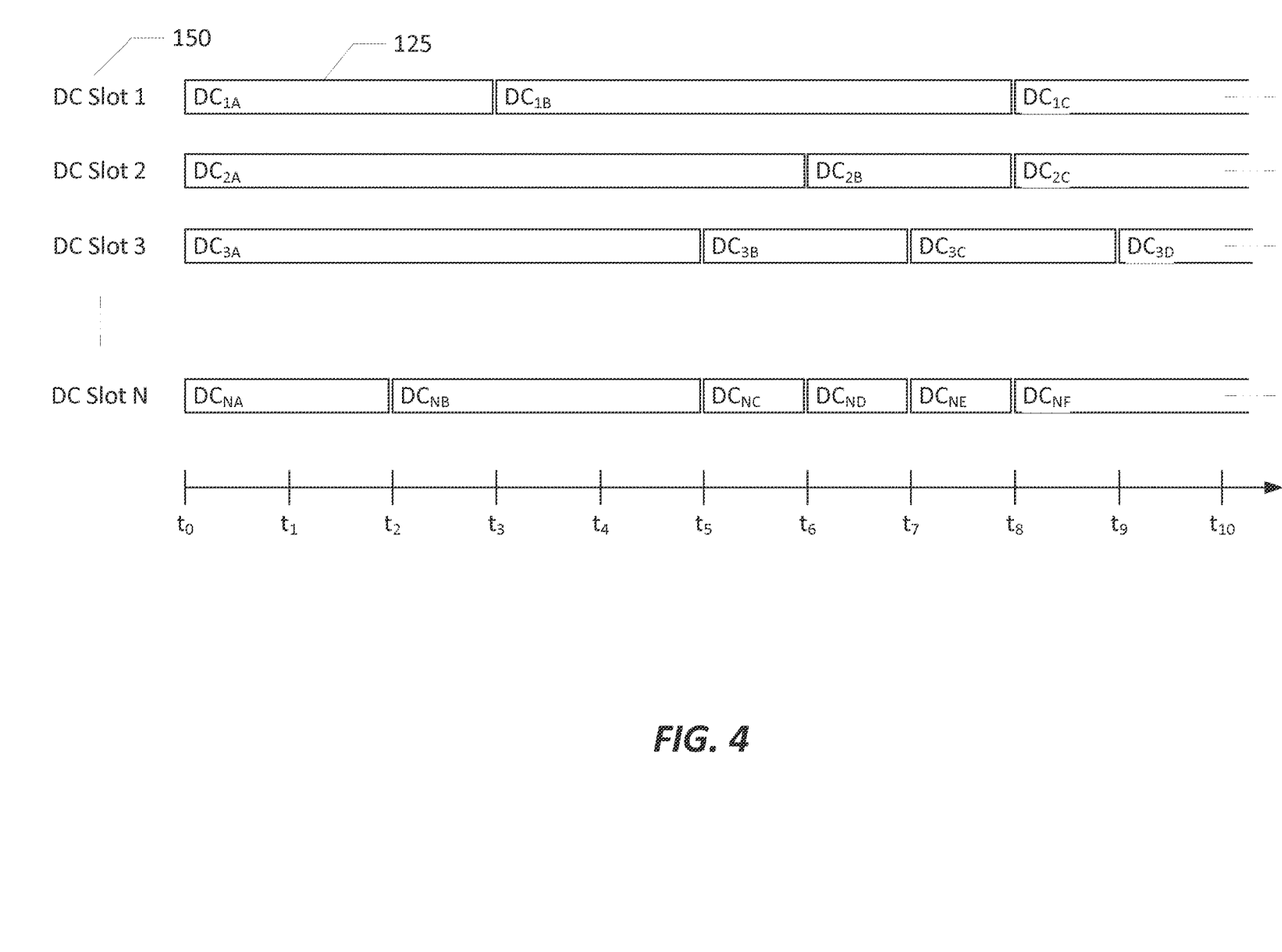
FIG. 4 is a timing diagram illustrating the operation of a plurality of dendritic cell instances operating in parallel.

FIG. 4 is a timing diagram illustrating the operation of a plurality of DC instances 125 (labeled $DC_{1A}$ through $DC_{NF}$ in FIG. 4), operating in parallel. In the illustrated example, the timing diagram includes a time axis beginning at time $t_0$ and divided into 10 substantially equal units. Each unit on the time axis may represent an interval such as 0.5 seconds, 1 second, 5 seconds, 10 seconds, or any other suitable time interval.

As described above, the DCA module 105 comprises a plurality of DC slots 150, in which the individual DC instances 125 operate. Each individual DC instance 125 has a randomly selected threshold (typically within a predetermined range) to "age out," or transition from the correlating state to the information presenting state (as determined in decision block 335 of FIG. 3). For instance, DC instance $DC_{1A}$ may have a threshold of about 4 units, DC instance $DC_{1B}$ may have a threshold of about 9 units, DC instance $DC_{1C}$ may have a threshold of about 6 units, and so on. As shown in FIG. 4, all of the DC instances 125 start at the same time, $t_0$, but they age out at different times, as determined by their respective maturation thresholds. For example, DC instance $DC_{NA}$ ages out at time $t_2$, DC instance $DC_{1A}$ ages out at time $t_3$, DC instance $DC_{3A}$ ages out at time $t_5$, DC instance $DC_{2A}$ ages out at time $t_6$, and so on.

The DCA module 105 associated with any process 155 within the computing device 100 may be in communication with other DCA modules 105 as shown in FIG. 1. In operation, the DCA modules 105 constantly monitor the processes 155 for abnormal activity, which may be identified as a harmful antigen based on selected criteria, as described above in connection with FIG. 3. When such a harmful antigen is identified for a particular process 155, the corresponding DCA module 105 may transmit an inflammatory signal to the remaining processes 155 with corresponding DCA modules 105 within the computing device 100.

This inflammatory signal is analogous to the human immune system's inflammatory cytokines (e.g., interferon, tumor necrosis factor, etc.). The inflammatory signal is used to indicate to other processes 155 having corresponding DCA modules 105 that a possible attack is underway, and for the other DCA modules 105 to modulate their response to local signal changes. The inflammatory signal is preferably a continuous variable, which may range from −1 to 1 in some cases. Negative values can be used to indicate that an event should reduce the response to a given stimulus. For example, installing or upgrading a piece of software may often appear to be a malware attack, so a negative inflammatory signal value may be used to reduce the response for this particular event. The inflammatory signal is raised when one or more antigens have been detected as a possible invader, or a known event has occurred. The strength of the inflammatory signal may be proportional to the degree of certainty of the attack or the degree of severity of the attack.

Like the human immune system, the inflammatory signal does not contain details about the specifics of the possible attack. Rather, the inflammatory signal merely indicates that a given process 155 may be experiencing something unexpected or problematic. Such an indication advantageously reduces the likelihood of so-called confirmation bias, i.e., a situation in which a DCA module 105 of process 155 is more likely to find a particular pattern because it is increasing the sensitivity of the particular pattern search. In addition, if an attack is localized to a process 155, other processes 155 that are unaffected will not be unfairly penalized.

Figure 5:
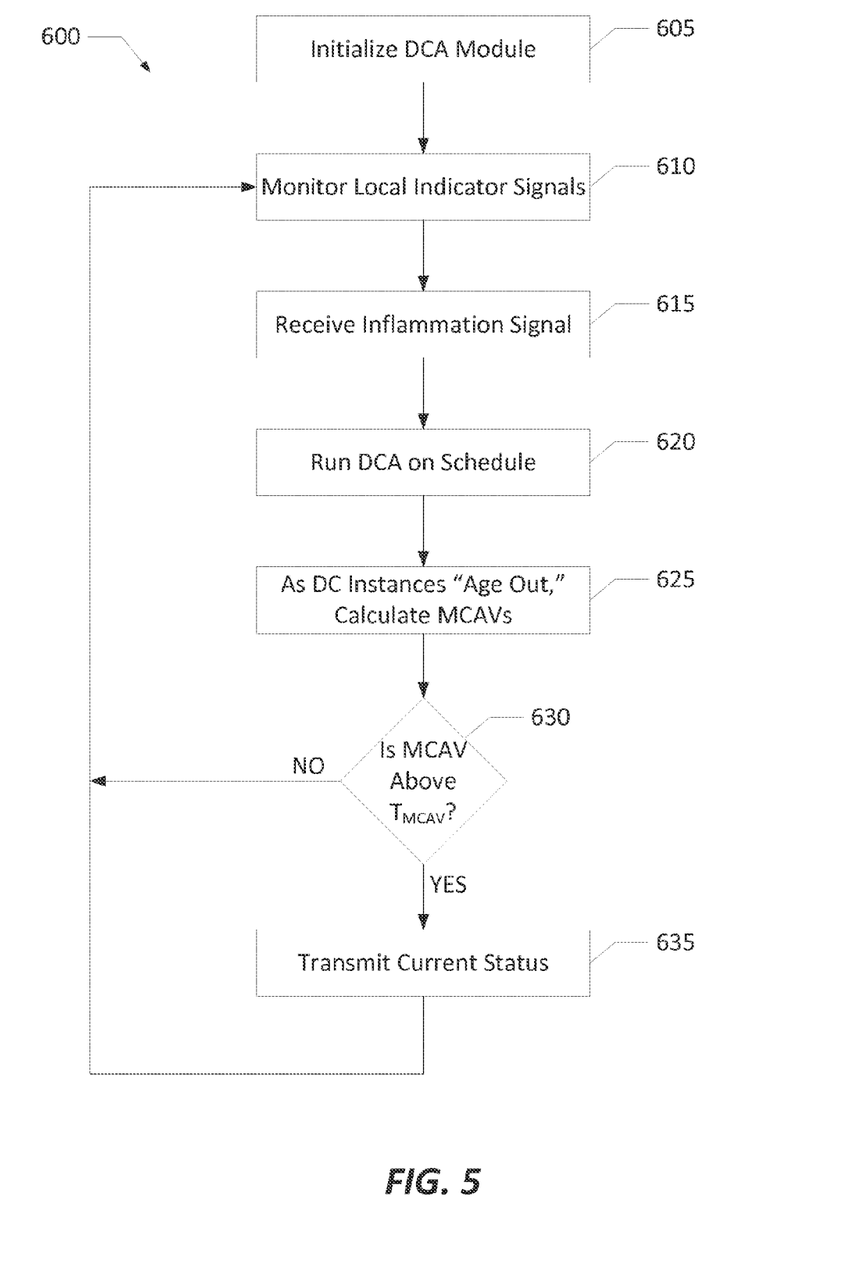
FIG. 5 is a flow chart illustrating the operation of a plurality of processes in a computing device communicating signals generated by one or more DCA modules.

FIG. 5 is a flow chart illustrating the operation of a plurality of processes 155 in a computing device 100 communicating signals generated by one or more DCA modules 105. In the illustrated example, the process begins with a first step 605, in which the DCA module 105 of a given process 155 is initialized. In a next step 610, the DCA module 105 monitors the local indicator signals 135 (e.g., PAMP, Danger, and Safe) collected locally at the DCA module 105 for the process 155. In a next step 615, the DCA module 105 receives an inflammation signal, which may be sent from a DCA module 105 corresponding to another process 155 of the computing device 100, as described above. In a next step 620, the DCA module 105 runs according to its respective schedule, with individual DC instances 125 in corresponding DC slots 150 being created and aging out at different intervals, as shown in FIG. 4. In a next step 625, as individual DC instances 125 age out, the DCA module 105 calculates an overall mature context antigen value (MCAV) of the computing device 100.

In some cases, the process includes an optional step 630, in which a determination is made as to whether the MCAV is above a selected threshold, $T_{MCAV}$. If not, the process returns to step 610 and repeats until the MCAV exceeds the selected threshold before proceeding to step 635. In other cases, the process proceeds directly to step 635, in which the DCA module 105 transmits the process status signal to the DCA modules 105 for other processes 155, regardless of whether the overall MCAV exceeds a threshold. In such cases, the current process status signal may indicate danger or distress at the transmitting process 155, or it may indicate simply that the transmitting process 155 is functioning normally. Accordingly, the DCA module 105 of a given process 155 can provide virtually continuous status updates to other processes 155 of the computing device 100.

Figure 6:
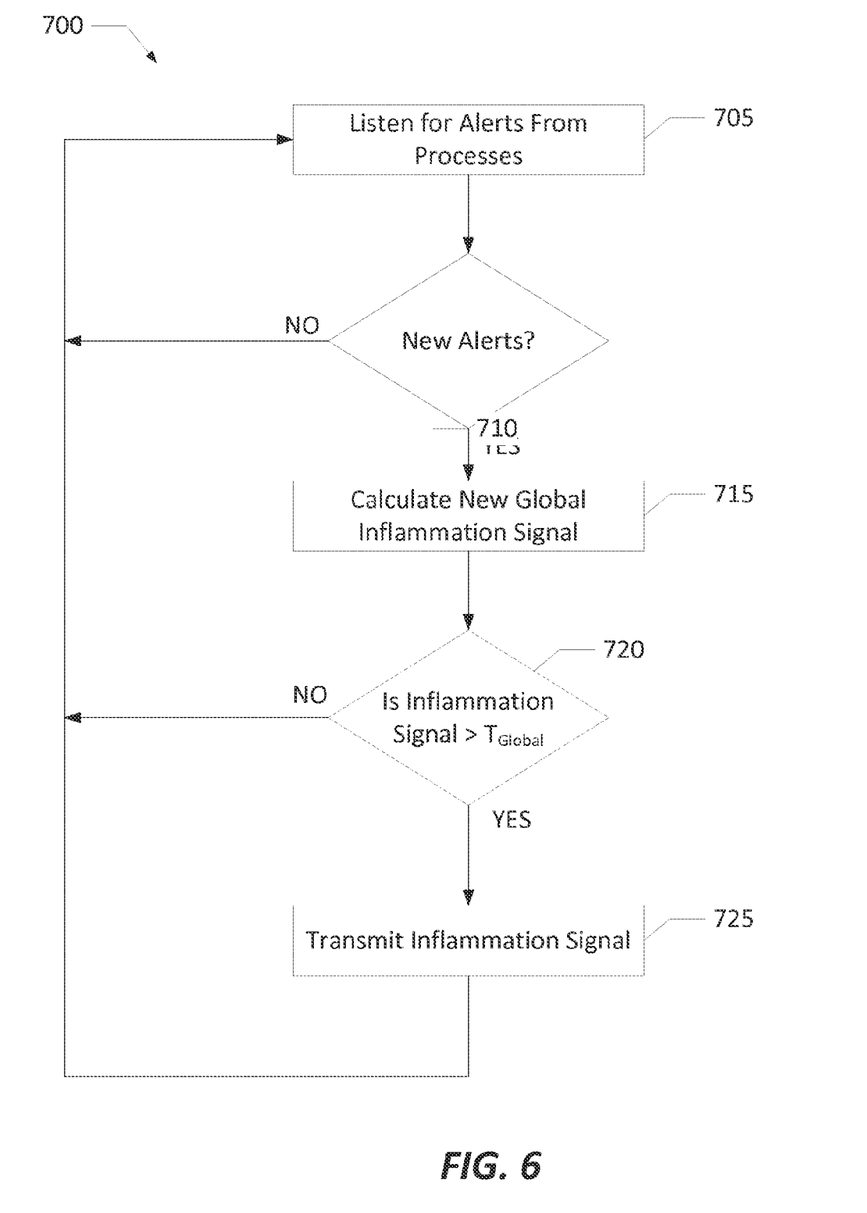
FIG. 6 is a flow chart illustrating the operation of a computing device having one or more processes associated with a DCA module.

FIG. 6 is a flow chart illustrating the operation of a computing device 100 having one or more processes 155 with a DCA module 105. In a first step 705, a DCA module 105 may monitor for status signals from the DCA modules 105 for one or more processes 155. As described above in connection with FIG. 6, such status signals may be generated and transmitted by the DCA module 105 of a process 155 following the calculation of the MCAV (e.g., at step 635 or 640 of FIG. 6). In a next step 710, a determination is made as to whether any new status signals have been received. If not, the process returns to the listening step 705 and repeats until a new status signal is received. Once that occurs, as shown at step 715, a new global inflammation signal is calculated for the computing device 100.

In some cases, the process includes an optional step 720, in which a determination is made as to whether the magnitude the global inflammation signal is above a selected threshold, $T_{GLOBAL}$. If not, the process returns to the listening step 705 and repeats until the magnitude of the inflammation signal exceeds the selected threshold, $T_{GLOBAL}$. In other cases, the process proceeds directly to step 730, in which the DCA module 105 for one process 155 transmits the inflammation signal to the other DCA modules 105 for other processes 155 of the computing device 100, regardless of whether magnitude of the inflammation signal exceeds a threshold. Accordingly, the DCA modules 105 can provide virtually continuous updates within the computing device 100 regarding the inflammation signal.

The systems and methods described above demonstrate a number of distinct advantages over previous approaches. For example, the DCA module 105 of the present application demonstrates consistently positive results, i.e., higher rates of detection, with lower rates of false positives, when compared with previous DCA implementations. In addition, the DCA module 105 exhibits a higher speed of detection that previous DCA implementations. Furthermore, the DCA module 105 can be run with minimal processor and memory requirements.

Although various embodiments have been shown and described, the present disclosure is not so limited and will be understood to include all such modifications and variations are would be apparent to one skilled in the art.

What is claimed is:

1. A system comprising:
  a processor;
  a memory, the memory with instructions stored therein to implement:
    a first process; and
    a first dendritic cell algorithm (DCA) module, wherein the first DCA module uses a DCA to analyze the first process to determine if malicious software exists, wherein the first DCA module comprises a pathogenic associated molecular patterns (PAMP) signal, a danger signal, a safe signal, and an inflammatory signal, wherein the inflammatory signal without PAMP, danger, and safe signals indicates a likelihood that the first process has been attacked by malicious software.

2. The system of claim 1, further comprising:
a second process; and
a second DCA module, wherein the second DCA module uses the DCA to analyze the second process to determine if malicious software exists.

3. The system of claim 1, wherein the inflammatory signal comprises a continuous variable having a value within a range of −1 to 1.

4. The system of claim 1, wherein the inflammatory signal has a strength proportional to a degree of certainty that the first process has been attacked by malicious software.

5. The system of claim 1, wherein a sensitivity of the DCA module is reduced in response to receiving a status signal.

6. The system of claim 5, wherein the status signal indicates that a process is functioning normally.

7. The system of claim 1, wherein the first DCA module comprises:
a plurality of sensors configured to measure raw sensor data;
a plurality of indicators created based on raw sensor data measured by the sensors;
a signal combiner;
a tissue module; and
a plurality of individual dendritic cell (DC) instances.

8. The system of claim 7, wherein the tissue module further comprises a temporal combiner that combines one or more aggregated signals from the signal combiner to generate a DC-Seen signal that is communicated to the plurality of individual DC instances.

9. The system of claim 7, wherein the raw sensor data comprises individual process information.

10. The system of claim 7, wherein the indicators comprise one or more signals representative of a heartbeat, packet size, network address, bandwidth, or processor load.

11. The system of claim 7, wherein the signal combiner sums the indicators.

12. The system of claim 7, wherein the signal combiner averages the indicators.

13. The system of claim 7, wherein the signal combiner determines the median value of the indicators.

14. The system of claim 7, wherein the tissue module manages an indicator signal and an antigen signal, and provides data to the plurality of individual DC instances.

15. A method of operating a computer network comprising a plurality of computing nodes, the method comprising:
running a Dendritic Cell Algorithm (DCA) on a first DCA module;
identifying a harmful antigen by observing abnormal activity of a first process based on predetermined criteria established by the first DCA module; and
transmitting a pathogenic associated molecular patterns (PAMP) signal, a danger signal, a safe signal, and an inflammatory signal, wherein the inflammatory signal is based on the abnormal activity of the first process from the first DCA module to a second DCA module, and wherein the inflammatory signal without PAMP, danger, and safe signals indicates a likelihood that the first process has been attacked by malicious software.

16. The method of claim 15, further comprising:
running a DCA on a second DCA module;
identifying a harmful antigen by observing abnormal activity of a second process based on predetermined criteria established by the second DCA module; and
transmitting an inflammatory signal based on the abnormal activity of the second process from the second DCA module to a DCA module.

17. The method of claim 15, wherein running the DCA on the first DCA module comprises:
initializing an individual Dendritic Cell (DC) instance within the first DCA module;
receiving raw sensor data from sensors of the first DCA module;
creating an antigen signal in a data processing event;
processing the raw sensor data to create an indicator signal comprising a vector of the following signals: (a) pathogenic associated molecular patterns (PAMP), (b) Danger, (c) Safe, and (d) Inflammation signal;
passing the indicator signal to a signal transformation event;
passing the antigen signal to an antigen sampling event;
correlating the indicator signal and sampled antigen signals based on their time stamps;
determining whether a maturation threshold has been reached and, if so, changing the DC instance from a correlating state to an information presenting state.

18. The method of claim 17, wherein the antigen signal represents a program name, a file name, or a network address of a node.

* * * * *